United States Patent Office 3,140,306
Patented July 7, 1964

3,140,306
METHOD OF MAKING ALIPHATIC AND AROMATIC THIO AND SULFONYL CHLORO- AND BROMOALKANENITRILES
Samuel Allen Heininger, Warson Woods, Mo., assignor to Monsanto Company, a corporation of Delaware
No Drawing. Filed July 2, 1958, Ser. No. 746,111
16 Claims. (Cl. 260—465)

The invention relates to a method of reacting alkali metal thioates or sulfinates with 2,3-dichloropropionitrile or 2,3-dibromopropionitrile to produce the corresponding 3-sulfenyl- or 3-sulfonyl-2-chloro- or bromoalkanenitrile. This application is a continuation-in-part of my copending application Serial Nos. 641,475, now U.S. 2,919,224, and 641,477 now U.S. 2,919,225, filed February 21, 1957.

The reaction, for example, of p-chlorobenzenesulfenyl chloride and acrylonitrile has been found to give a complex mixture of perhaps four different compounds including 3-(p-chlorophenylthio)-2-chloropropionitrile, 2-(p-chlorophenylthio) - 3 - chloropropionitrile and dehydrochlorination products thereof. As indicated in copending application Serial No. 641,477, filed February 21, 1957, these isomers or dehydrochlorination products are difficult, if not impossible, to separate. Surprisingly, it has now been found, for example, that if sodium p-chlorophenylthioate is reacted with 2,3-dichloropropionitrile the 3-chlorine atom reacts preferentially to give 3 - (p-chlorophenylthio)-2-chloropropionitrile which is easily isolable from the reaction mixture in high yields approaching 100% under optimum conditions. This new method is clearly superior, for example, to the addition of p-chlorothiophenol to α-chloroacrylonitrile, which material must be prepared by dehydrochlorination of 2, 3-dichloropropionitrile. The new method also possesses an advantage over the addition of a sulfenyl chloride to acrylonitrile, since it eliminates the necessity of preparing and isolating the relatively unstable sulfenyl chloride. To my knowledge, this reactivity, especially in substitution reactions, of the 3-chlorine in 2,3-dichloropropionitrile has not previously been known.

Broadly, the invention involves the reaction of an alkali metal salt of alkyl, aryl, aralkyl, alkaryl or cycloalkyl thiols or mercaptans, or sulfinic acids, or the halo or nitro-substituted products thereof with 2,3-dichloropropionitrile or 2,3-dibromopropionitrile. The 2,3-dichloropropionitrile is made by the chlorination of acrylonitrile and the 2,3-dibromopropionitrile is made by the bromination of acrylonitrile. The alkali metal salts are formed by reacting the thiol or mercaptan, or sulfinic acid with an alkali metal hydroxide.

More narrowly the new method of the invention comprises reacting a compound of the formula

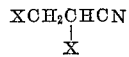

where X is selected from the class consisting of bromine and chlorine, with a compound of the formula

R—Y—M wherein R is selected from the class consisting of phenyl, halophenyl, nitrophenyl, lower alkyl, halogented lower alkyl and nitrated lower alkyl radicals, Y is selected from the class consisting of S and SO₂, and M is an alkali metal, and separating from the reaction mixture a compound of the formula

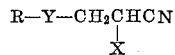

wherein R, X and Y are as defined hereinabove.

An illustrative listing of the alkali metal mercaptides of the invention is as follows: sodium methylmercaptide, potassium methylmercaptide, lithium methylmercaptide, rubidium methylmercaptide, cesium methylmercaptide, sodium ethylmercaptide, sodium propylmercaptide, sodium isopropylmercaptide, sodium isobutylmercaptide, sodium tertiary-butylmercaptide, potassium pentylmercaptide, sodium hexylmercaptide, sodium chloromethylmercaptide, sodium iodomethylmercaptide, sodium fluoromethylmercaptide, sodium 2 - bromoethylmercaptide, sodium nitromethylmercaptide, etc. Also it should be noted that the longer chain compounds, such as sodium dodecylmercaptide, will also react by the process of the invention.

An illustrative listing of the alkali metal aliphatic sulfinates of the invention is as follows: sodium methylsulfinate, potassium ethylsulfinate, lithium propylsulfinate, rubidium isopropylsulfinate, cesium butylsulfinate, sodium isobutylsulfinate, sodium t-butylsulfinate, potassium pentylsulfinate, sodium hexylsulfinate, sodium chloromethylsulfinate, sodium iodomethylsulfinate, sodium fluoromethylsulfinate, sodium 2-bromopropylsulfinate, sodium 3-nitropropylsulfinate, sodium dodecylsulfinate, etc.

An illustrative listing of the alkali metal aromatic thioates of the invention is as follows:

sodium phenylthioate,
potassium p-chlorophenylthioate,
sodium p-iodophenylthioate,
sodium p-fluorophenylthioate,
lithium o-chlorophenylthioate,
rubidium m-chlorophenylthioate,
cesium 2,4-dichlorophenylthioate,
sodium 2,3,5-trichlorophenylthioate,
sodium 2,3,4,6-tetrachlorophenylthioate,
sodium pentachlorophenylthioate,
potassium o-bromophenylthioate,
sodium m-nitrophenylthioate,
sodium p-tolylthioate,
sodium o-tolylthioate,
sodium m-tolylthioate,
sodium 2,4-xylylthioate,
potassium p-propylphenylthioate,
sodium m-butylphenylthioate,
sodium o-hexylphenylthioate, etc. In addition to the compounds named, such higher aromatic compounds as, e.g., sodium α-naphthylthioate will also react in the method of the invention.

An illustrative listing of the alkali metal aromatic sulfinates of the invention is as follows:

sodium phenylsulfinate,
potassium o-chlorophenylsulfinate,
sodium o-iodophenylsulfinate,
sodium m-fluorophenylsulfinate,
lithium m-chlorophenylsulfinate,
rubidium p-chlorophenylsulfinate,
cesium 2,3-dichlorophenylsulfinate,
potassium 2,4,5-trichlorophenylsulfinate,
sodium pentachlorophenylsulfinate, potassium o-bromophenylsulfinate
sodium m-bromophenylsulfinate,
sodium p-bromophenylsulfinate,
potassium 3,4-dibromophenylsulfinate,
sodium 2,3,4,5-tetrabromophenylsulfinate
sodium pentabromophenylsulfinate,
lithium o-nitrophenylsulfinate,
sodium o-tolylsulfinate,
potassium m-tolylsulfinate,
sodium p-tolylsulfinate,
sodium 3,4-xylylsulfinate,
sodium 2,4,6-trimethylphenylsulfinate,
sodium o-ethylphenylsulfinate,
potassium m-isobutylphenylsulfinate,
sodium p-hexylphenylsulfinate,
sodium o-methyl-p-pentylphenylsulfinate, etc. Also such higher aromatic compounds as sodium α-naphthylsulfinate, will react in the method of the invention.

An illustrative although abbreviated listing of the desired products recovered by the method of the invention will be given below. An illustrative listing of the 3-alkylthio-2-chloro or bromopropionitriles is as follows:

3-methylthio-2-chloropropionitrile,
3-propylthio-2-chloropropionitrile,
3-t-butylthio-2-chloropropionitrile,
3-pentylthio-2-chloropropionitrile,
3-hexylthio-2-chloropropionitrile,
3-methylthio-2-bromopropionitrile,
3-fluoromethylthio-2-chloropropionitrile,
3-chloromethylthio-2-chloropropionitrile,
3-iodomethylthio-2-chloropropionitrile,
3-nitromethylthio-2-chloropropionitrile,
3-dodecylthio-2-chloropropionitrile,
3-α-naphthylthio-2-chloropropionitrile, etc.

An illustrative listing of the 3-aliphaticsulfonyl-2-chloro or bromopropionitriles is as follows:

3-methylsulfonyl-2-chloropropionitrile,
3-isobutylsulfonyl-2-bromopropionitrile,
3-pentylsulfonyl-2-chloropropionitrile,
3-chloromethylsulfonyl-2-chloropropionitrile,
3-bromomethylsulfonyl-2-bromopropionitrile,
3-iodomethylsulfonyl-2-chloropropionitrile,
3-fluoromethylsulfonyl-2-chloropropionitrile,
3-nitromethylsulfonyl-2-chloropropionitrile,
3-octadecylsulfonyl-2-chloropropionitrile, etc.

An illustrative listing of the 3-aromaticthio-2-chloro or bromopropionitrile products of the method of the invention is as follows:

3-phenylthio-2-chloropropionitrile,
3-(o-chlorophenylthio)-2-chloropropionitrile,
3-(m-chlorophenylthio)-2-chloropropionitrile,
3-(p-fluorophenylthio)-2-chloropropionitrile,
3-(p-chlorophenylthio)-2-chloropropionitrile,
3-(o-iodophenylthio)-2-chloropropionitrile,
3-(m-chlorophenylthio)-2-chloropropionitrile,
3-(3,4,6-trichlorophenylthio)-2-chloropropionitrile,
3-pentachlorophenylthio-2-chloropropionitrile,
3-(p-chlorophenylthio)-2-bromopropionitrile,
3-(o-bromophenylthio)-2-bromopropionitrile,
3-(3,4-dibromophenylthio)-2-chloropropionitrile,
3-pentabromophenylthio-2-chloropropionitrile,
3-(p-nitrophenylthio)-2-chloropropionitrile,
3-(p-tolylthio)-2-chloropropionitrile,
3-(3,4-xylylthio)-2-bromopropionitrile,
3-(o-propylphenylthio)-2-chloropropionitrile, etc. Also such compounds as 3-(α-naphthylthio)-2-chloropropionitrile can be made by the method of the invention.

An illustrative listing of the 3-aromatic sulfonyl-2-chloro or bromopropionitrile products which can be produced by the method of the invention are as follows:

3-phenylsulfonyl-2-chloropropionitrile,
3-(o-bromophenylsulfonyl)-2-chloropropionitrile,
3-(o-iodophenylsulfonyl)-2-chloropropionitrile,
3-(p-fluorophenylsulfonyl)-2-chloropropionitrile,
3-(p-chlorophenylsulfonyl)-2-bromopropionitrile,
3-(p-chlorophenylsulfonyl)-2-chloropropionitrile,
3-(2,4-dichlorophenylsulfonyl)-2-chloropropionitrile,
3-(2,4,6-trichlorophenylsulfonyl)-2-bromopropionitrile,
3-pentachlorophenylsulfonyl-2-chloropropionitrile,
3-(p-bromophenylsulfonyl)-2-bromopropionitrile,
3-(p-nitrophenylsulfonyl)-2-chloropropionitrile,
3-(o-tolylsulfonyl)-2-chloropropionitrile,
3-(m-tolylsulfonyl)-2-chloropropionitrile,
3-(m-tolylsulfonyl)-2-bromopropionitrile,
3-(p-tolylsulfonyl)-2-bromopropionitrile,
3-(3,4-xylylsulfonyl)-2-chloropropionitrile,
3-(2-methyl-3-propylphenylsulfonyl)-2-chloropropionitrile, etc.

Also compounds such as 3-(α-naphthylsulfonyl)-2-chloropropionitrile can be made by the method of the invention.

The process of the invention whereby the 3-thio- or sulfonyl-2-chloro or bromopropionitriles are obtained involves contacting approximately equimolecular amounts of the 2,3-dichloro or dibromopropionitrile with the thioate or sulfinate. If desired, an excess of the more readily available component can be present in the reaction mixture to serve, e.g., as a reaction medium. The reaction appears to consume approximately equimolecular amounts of each reactant, and when an excess of either compound is used the excess is recovered unchanged at the close of the reaction period. The rapidity of the reaction varies greatly, depending upon the reactants chosen, some reactions being exothermic and requiring solvents and/or diluents to moderate their violence, while others do not reach completion until after a period of heating at elevated temperatures. Also in the case of the exothermic reactions cooling of the reaction mixture can be used to moderate the voilence of the reaction. The reaction proceeds quite suitably in the presence of water, or other polar solvents such as alcohols, ketones, etc.; however, the reaction can be carried out in the absence of solvents or diluents. The reaction can be carried out in the presence of inert solvents and diluents such as benzene, halogenated solvents such as carbon tetrachloride, ethers, etc. The reaction can be carried out under pressure or vacuum, and when pressure is used in the reaction can conveniently be carried out at elevated temperatures when more refractory compounds are employed in the reaction. The time for carrying out the reaction varies depending on the particular reactant and the temperature of the reaction. Catalysts could be used in this reaction but are not required. The product is recovered from the reaction mixture by conventional methods such as filtration, decantation, distillation, evaporation, crystallization, etc.

The products of the invention are valuable microbiological toxicants. These products can also be used as the active ingredient in such compositions as herbicides, plant fungicides, etc.

The invention will be more clearly understood from the following detailed description of specific examples thereof:

*Example 1*

Sodium p-chlorophenylthioate was prepared by addition of 72 g. (0.5 mol) of p-chlorothiophenol to an aqueous concentrated solution of sodium hydroxide. This solution was then gradually added, with vigorous stirring, to a mixture of 62 g. (0.5 mol) of 2,3-dichloropropionitrile in 300 ml. of water, while the temperaure was held below 35° C. by cooling. The reaction product was extracted with ether, the ether solution dried, the ether removed by evaporation, and the remaining product distilled. There were, thus obtained, 92 g. (79.5% yield) of 3-(p-chlorophenylthio)-2-chloropropionitrile, as a yellow liquid, B.P. 144–146° C./0.4 m., $n_D^{25}$ 1.5898, having the analytical composition of $C_9H_7Cl_2NS$ and exhibiting the characteristic infrared spectrum of an α-chloronitrile.

Example 2

This is another example of the preparation of 3-(p-chlorophenylthio)-2-chloropropionitrile. A sample of 289 g. (2 mols) of p-chlorothiophenol was placed in a 2-liter flask in an ice bath and a solution of 80 g. (2 mols) of sodium hydroxide in 800 ml. of water was added. Over a period of 2 hours, 247.5 g. (2 mols) of 2,3-dichloropropionitrile was added to the flask keeping the temperature at 15–20° C. with cooling. The mixture of reactants was stirred for one hour longer and then allowed to stand overnight. The product had solidified to small pellets. These pellets were filtered from the reaction mixture and recrystallized from 3 liters of ethanol. The product crystallized in fine white needles which melted at 42–43° C. A total of 203 g. of product was recovered in this first crop of crystals. Concentration of the filtrate and dilution with water gave a second crop of crystals 128 g. having a melting point of 40–41° C. A third crop of crystals was obtained by similarly reprocessing the filtrate and this was 32 g. The total of these 3 crops of crystals was 363 g. or a 78.3% yield. An elementary analysis of the product gave the following results:

| Percent | Found | Calc'd as $C_9H_7Cl_2NS$ |
|---|---|---|
| C | 47.2 | 46.6 |
| H | 2.9 | 3.0 |
| N | 5.7 | 6.0 |
| Cl | 30.4 | 30.5 |
| S | 14.1 | 13.8 |

Example 3

This example describes the preparation of 3-phenylthio-2-chloropropionitrile. To a 5-liter flask was charged 280 g. (7 mols) of NaOH and 1500 ml. of water, and the mixture was stirred until the sodium hydroxide dissolved. Then the sodium hydroxide solution was cooled by addition of ice and water and a cooling bath to 25° C. Over a period of about 10 minutes 770 g. (7.0 mols) of thiophenol was added to the flask keeping the temperature below 30° C. by cooling. Then over a period of about 45 minutes with ice bath cooling, 867 g. (7.0 mols) of 2,3-dichloropropionitrile was added to the reaction flask. The contents of the flask were cooled to keep the reaction temperature below 30° C. A yellow oil separated when agitation was stopped. This oil was drawn off and dried under aspirator vacuum at 50–60° C. for 4 hours. The dried product was a yellow liquid containing a slight amount of white curd. The liquid was decanted from the solids and weighed 1378 g. which was a yield of product closely approximating the theoretical yield.

Example 4

This is an example of the making of 3-(p-tolylthio)-2-chloropropionitrile. To a flask were added 27.8 g. (0.695 mol) of sodium hydroxide in 400 ml. of water. To this flask was then added 100 g. (0.8 mols) of p-toluenethiol. To the mixture in the flask were added 86 g. (0.695 mol) of 2,3-dichloropropionitrile with stirring and cooling to keep the temperature below 30–35° C. After stirring the reaction mixture for about 3 hours, a yellowish, oily layer settled out, and the reaction mixture was allowed to stand overnight. The organic layer was extracted with ether and the ether layer washed once with water, dried over sodium sulfate and distilled. In the distillation the ether was first removed, then the following fractions were collected: (a) 22.5 g. of p-toluenethiol boiling at 46–47° C./1.5 mm. (b) 23.5 g. of product boiling at 141–144° C./1.2 mm. and having a refractive index of $n_D^{15}$ 1.5668, and (c) 104.1 g. boiling point 141–144° C./1.2 mm. having a refractive index of $n_D^{25}$ 1.5680.

It appears that fraction (b) has been slightly contaminated with fraction (a). Based on the charge of propionitrile the conversion was 86.7%. An elemental analysis of the product, i.e., fractions (b) and (c) gave the following results:

| Percent | Found | Calc'd for $C_{10}H_{10}ClNS$ |
|---|---|---|
| C | 57.5 | 56.8 |
| H | 4.8 | 4.77 |
| N | 6.81 | 6.62 |
| Cl | 14.1 | 16.8 |
| S | 15.7 | 15.15 |

Example 5

This is an example of the use of mixed xylenethiols in the method of the invention. In a 1-liter flask was placed 138 g. (1.0 mol based on xylenethiol) having a boiling range of 85–134.5° C./50 mm. of Hg and 40 g. (1 mol) of sodium hydroxide in 400 ml. of water. The mixture was stirred and the temperature kept below 40° C. with cooling. After the reaction was complete the contents of the flask were cooled to 25° C. and over a period of one hour 123.9 g. (1 mol) of 2,3-dichloropropionitrile was added to the flask. Cooling was used to keep the temperature between 25–30° C. during the reaction. The reactants were stirred for one additional hour. Then the cooled reactants were extracted with ether, and the ether layer was washed once with water. After drying the ether layer, over sodium sulfate, the ether was distilled off under vacuum. The residual product was an orange oil weighing 205 g., $n_D^{25}$ 1.5706. Product yield based on a molecular weight of 138 for the thiol was 91%.

Example 6

This is an example of the use of the sodium salt of mixed thiocresols (largely the meta isomer) in the method of the invention. In a 1-liter flask was placed 124 g. (1 mol) of mixed thiocresols, and 40 g. (1.0 mol) of sodium hydroxide in 400 ml. of water was added with cooling. To this stirred solution over a period of about ½ to ¾ hour 123.7 g. (1 mol) of 2,3-dichloropropionitrile was added with external cooling to keep the temperature below 40° C. The reaction mixture was stirred for an additional 2 hours after the completion of the addition of the 2,3-dichloropropionitrile. Then the reaction mixture was extracted with ether, the ether layer dried, and the ether removed under reduced pressure. The resulting product was a red liquid, $n_D^{25}$ 1.5702, weight 199 g. giving a 94% yield based on the thiocresols.

Example 7

This is an example of the use of sodium p-toluenesulfinate in the method of the invention. A sample of 53.4 g. (0.3 mol) of sodium p-toluenesulfinate (prepared by the reaction of sodium hydroxide with p-toluenesulfinic acid) was placed in a flask and dissolved in 250 ml. of water. To this flask was added dropwise 37.2 g. (0.3 mol) of 2,3-dichloropropionitrile. The reaction was not exothermic and the reactants were stirred and slowly warmed at 75° C. over a period of ½ hour. During this period of time the reaction mixture changed from cloudy to a turbid oily mixture. An oily separated out on cooling. The oily layer was extracted with ether, the ether layer dried over sodium sulfate, and the ether distilled off. The product was a yellow viscous oil. This crude product was subjected to vacuum distillation at 0.3 mm. of Hg to a pot temperature of 170° C. A colorless distillate of 15.1 g., $n_D^{25}$ 1.4610, B.P. 25–30° C./0.3 mm. which was most likely unreacted 2,3-dichloropropionitrile was taken off. The residue was a viscous dark oil weighing 35.5 g. The residue was dissolved in ethyl alcohol and water, decolorized with charcoal, and it crystallized on cooling. A crystalline product of 21.5 g. of tiny plates, yellowish in color, M.P. 72–75° C. were recovered. A second recrystallization gave white, very tiny plates, still melting at 72–75° C. but not sharply with final complete melting at 80° C. It seems clear that the product is not completely pure, since pure 3-(p-toluenesulfinyl)-2-chloropropionitrile has a melting point of 82–83° C. A small amount of the crude crystalline sample was dissolved in ether and triethylamine was added to cause dehydrochlorination. A white precipitant appeared immediately. Water was added and the ether layer was decanted from the precipitant. The ether layer was then evaporated leaving a white solid, M.P. 129–130° C. A mixed melting point between this sample and a sample of pure 3-(p-toluenesulfonyl)-acrylonitrile, M.P. 131–132° C. gave no depression in melting point showing that the products were identical. Thus the 21.5 g. of product (about 34% yield) described above is substantially pure 3-(toluenesulfonyl)-2-chloropropionitrile. An elementary analysis of a sample of the 21.5 gram product yielded the following results:

| Percent | Found | Calc'd for $C_{10}H_{10}ClNO_2S$ |
|---|---|---|
| C | 51.5 | 49.3 |
| H | 4.07 | 4.1 |
| N | 6.52 | 5.8 |
| Cl | 15.97 | 14.6 |
| S | 14.62 | 13.1 |

*Example 8*

This is an example of the preparation of 3-methylthio-2-chloropropionitrile by the method of the invention. In a 1-liter flask is placed 12 grams (0.3 mol) of sodium hydroxide dissolved in 100 ml. of water. The flask and contents are cooled to about 0° C. or below, and 14.4 g. (0.3 mol) of methylmercaptan are added slowly with stirring and cooling to keep the reactants at 0° C. or lower. Then the addition of 37.2 g. (0.3 mol) of 2,3-dichloropropionitrile is begun. The flask contents are subjected to external cooling as by ice bath and the 2,3-dichloropropionitrile is added over a period of about ½ hour keeping the temperature below about 40° C. The reaction mixture is stirred for 2 hours longer, and, if desired, to insure completeness of the reaction, the reaction mixture can be slowly heated to about 75° C.; however, the additional heating is not usually necessary with these particular reactants, the reaction being exothermic. Then the organic layer which separates is extracted with ether, the ether solution washed with water, the ether layer dried, and the ether evaporated. The residue product can be further purified by distillation to remove unreacted 2,3-dichloropropionitrile, if desired, and to also recover the product as a distillate fraction, which product will be recovered in high yields having a B.P. of 90–91° C.%10 mm. of Hg, $n_D^{20}$ 1.5070 and $n_D^{25}$ 1.5050.

In an analogous manner such compounds as 3-substituted thio-2-chloropropionic acid or the esters, salts or amides thereof can be made by reacting 2,3-dichloropropionic acids or the esters, salts or amides thereof with alkali metal salt of thiols, and sulfonyl analogs of these compounds can be made similarly.

Although the invention has been described in terms of specified examples, which are set forth in considerable detail, it should be understood that this is by way of illustration only and that the invention is not necessarily limited thereto, since alternative embodiments will become apparent to those skilled in the art in view of the disclosure. Accordingly, modifications are contemplated which can be made without departing from the spirit of the described invention.

What is claimed is:

1. A method of making compounds of the formula

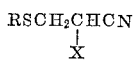

wherein R and X are defined hereinbelow comprising contacting a compound of the formula

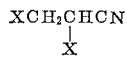

wherein X is selected from the group consisting of bromine and chlorine, with a compound of the formula

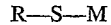

wherein R is selected from the class consisting of phenyl, lower-alkylphenyl, halophenyl, nitrophenyl, lower alkyl, halogenated lower alkyl and nitrated lower alkyl radicals, and M is an alkali metal.

2. The method of claim 1, wherein the reaction is carried out in aqueous media, the nitrile reactant is 2,3-dichloropropionitrile, the other reactant is sodium phenylmercaptide and the product is 3-phenylthio-2-chloropropionitrile.

3. The method of making a 3-chlorophenylthio-2-chloropropionitrile comprising contacting 2,3-dichloropropionitrile with a chloro-substituted sodium phenylthioate.

4. The method of claim 3, wherein the reaction is carried out in aqueous medium, said phenylthioate is sodium p-chlorophenylthioate and the product is 3-(p-chlorophenylthio)-2-chloropropionitrile.

5. The method of making a 3-alkylphenylthio-2-chloropropionitrile comprising contacting 2,3-dichloropropionitrile with a lower alkyl-substituted sodium phenylthioate.

6. The method of claim 5, wherein the reaction is carried out in aqueous medium, the thioate is sodium p-toluenethioate, and the product is 3-(p-toluenethio)-2-chloropropionitrile.

7. The method of claim 5, wherein the reaction is carried out in aqueous medium, the thioate is a mixture of sodium monomethylphenylthioate isomers, and the product is a mixture of 3-(monomethylphenylthio)-2-chloropropionitrile isomers.

8. A method of making a compound of the formula

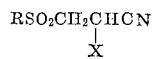

wherein R and X are as defined hereinbelow comprising contacting a compound of the formula

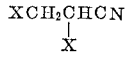

wherein X is selected from a group consisting of bromine and chlorine, with a compound of the formula

wherein R is selected from a class consisting of phenyl, lower-alkylphenyl, halophenyl, nitrophenyl, lower alkyl, halogenated lower alkyl and nitrated lower alkyl radicals, and M is an alkali metal.

9. A method of making a compound of the formula

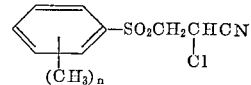

wherein n is an integer from 0 to 2, comprising contacting 2,3-dichloropropionitrile with a compound of the formula

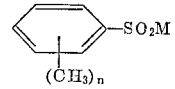

wherein n is as defined hereinabove and M is an alkali metal.

10. A method of making 3-(p-toluenesulfonyl)-2-chloropropionitrile, comprising contacting in an aqueous media 2,3-dichloropropionitrile with sodium p-toluenesulfinate.

11. A method of making 3-(phenylsulfonyl)-2-chloropropionitrile, comprising contacting in an aqueous media 2,3-dichloropropionitrile with a compound of the formula

wherein M is an alkali metal.

12. The method of claim 1 wherein the reaction is carried out in aqueous media.

13. The method of claim 3 wherein the reaction is carried out in aqueous media.

14. The method of claim 5 wherein the reaction is carried out in aqueous media.

15. The method of claim 9 wherein the reaction is carried out in aqueous media.

16. The method of claim 8 wherein the reaction is carried out in aqueous media.

References Cited in the file of this patent

UNITED STATES PATENTS

| | | |
|---|---|---|
| 1,712,365 | Steiger et al. | May 7, 1929 |
| 2,710,304 | Opfermann | June 7, 1955 |

OTHER REFERENCES

Gilman: "Organic Chemistry," vol. 1, second edition, 1943, page 854.

Rodd: "Chemistry of Carbon Compounds," volume 1, part A, 1951, page 347.